United States Patent Office 3,513,104
Patented May 19, 1970

3,513,104
SELF-PROPELLING POWDER COMPOSITIONS
Denis John Healy, Bronx, N.Y., assignor to Colgate-Palmolive Company, New York, N.Y., a corporation of Delaware
No Drawing. Filed Mar. 26, 1965, Ser. No. 443,088
Int. Cl. C09k *3/30*
U.S. Cl. 252—305    4 Claims

ABSTRACT OF THE DISCLOSURE

A self-propelling liquid composition capable of deposition as a powder in which a metal ester dissolved in a polyhalogenated propellant is converted to hydrolysis to a powder.

---

The present invention relates to self-propelling compositions capable of depositing material to form a powder and, more particularly, to a composition in aerosol form which is deposited as a powder under unusual ambient conditions.

For many days the art has known that smoke screens, which after all are only suspensions of finely divided particles in the air, can be produced from the halides of the members of the polyvalent metals, such as tin and titanium or the halides of silicon. However, these halides when hydrolyzed to produce the corresponding halogen acid and the hydroxide of the metal. Thus, silicon tetrafluoride hydrolyzes in a manner which can be represented by the following equation:

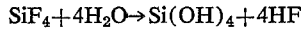
$$SiF_4 + 4H_2O \rightarrow Si(OH)_4 + 4HF$$

while the hydrolysis of titanium tetrachloride can be represented by the following equation:

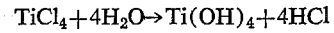
$$TiCl_4 + 4H_2O \rightarrow Ti(OH)_4 + 4HCl$$

While in the infinite dilution provided at sea or in other unconfined masses of the atmosphere the hydrogen halide produced by the hydrolysis is of little consequence, on the other hand, in a confined area such as a room in a dwelling or when the hydrolysis takes place in close proximity or on the human skin the hydrogen halide produced by the hydrolysis of the metal halide is at least undesirable if not unbearable.

The need for means to deposit a powder for various purposes has been recognized as is evidenced by the disclosure contained in U.S. Pat. No. 3,014,844. Therein is described a self-propelling power dispensing composition capable of producing a useful substance in aerosol form. This self-propelling powder dispensing composition comprises a finely-divided powder of a particle size less than about 100 microns suspended in a liquified propellant. It is to be noted that the patent product (1) is a suspension of solid particles and (2) the particle size is critical. The patented mixture likewise contains a surfactant such as the sorbitan esters sold under the trademark "Spans" or the polyalkylene derivatives of the sorbitan esters. However, it is well known that suspensions of solid particles, except those of colloidal size, tend to form strata during storage. Hence, suspensions of solid particles, except those of colloidal size, have not been found to be satisfactory. As these patentees suggest the active solid component can also be a cosmetic substance such as talc, an antiperspirant such as aluminum chlorohydrate, a polishing materal such as jeweler's rouge, a dye such as the approved food colorings, a lubricant such as graphite, and other finely divided materials.

Previously U.S. Pat. No. 2,659,704 issued in 1953 disclosing a composition comprising a $C_{12}$-$C_{18}$ fatty acid, a synthetic resin polymer, a solvent for the acid and the resin and the balance a polyhalogenated lower alkane refrigerant propellant. The principal use proposed for the patented formulation is as a self-spraying artificial snow.

I has now been discovered that a self-propelling, powder dispensing composition can be provided which avoids the necessity for the use of solid particles having a critical maximum diameter, which avoids the disability of stratification on storage, which avoids the production of hydrogen halide in situ, and nevertheless provides an aerosol formulation dispensing a powder which formulation does not obstruct valves presently used for the purpose of producing sprays or mists. Accordingly, it is an object of the present invention to provide a self-propelling formulation which under ambient conditions is dispensed as a spray or mist which deposits a powder on a surface juxtaposed to said spray or mist. It is another object of the present invention to provide a self-propelling composition comprising a propellant comprising a partially fluorinated, or wholly fluorinated, or a partially fluorinated-partially chlorinated, or a partially fluorinated-partially brominated hydrocarbon having not more than two carbon atoms or a mixture of two or more of the aforesaid and a hydrolyzable ester of an acid of a polyvalent metal or metalloid. It is a further object of the present invention to provide a self-propelling composition comprising a propellant comprising one or more of the partially or completely halogenated hydrocarbons of the classes named hereinbefore, at least one hydrolyzable ester of an acid of a polyvalent metal or metalloid and a emollient. It is within the purview of the present invention to provide an self-propelling composition comprising a solution of at least one hydrolyzable ester of an acid of at least one element of the fourth Group of the Periodic Table having atomic numbers greater than 12 and less than 178.6, i.e., having atomic weights in the range of 28 to 119. It is presently preferred to use the powder-producing base an ester of titanic acid and an alcohol innocuous to the human skin or mixture of innocuous alcohols such as aliphatic alcohols having one to twenty-two carbon atoms, aromatic alcohols, and cycloaliphatic alcohols. The foregoing esters of titanic acid are either liquids or solids depending upon the chain length of the alkyl group of the aliphatic esters but are soluble in the aforenamed propellants.

The titanium esters, e.g., tetraisopropyl titanate,

$$[(CH_3)_2CH]_4TiO_4$$

and tetrastearyl titanate, $[CH_3(CH_2)_{16}CH_2]_4TiO_4$ or in general $R_4TiO_4$ where R is an alkyl, aryl, or cycloalkyl radical hydrolyze when exposed to water either from the atmosphere or from a surface. The hydrolysis can be represented by the equation:

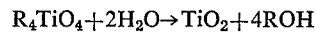
$$R_4TiO_4 + 2H_2O \rightarrow TiO_2 + 4ROH$$

These esters of the titanic acid, $H_4TiO_4$ are soluble in the propellants enumerated hereinbefore and generally known as "Freons." When these esters are pressurized with propellants such as the "Freons" and sprayed, ambient water vapor reacts with the ester while the spray is traveling to a surface to yield the oxide of the element and the alcohol. Thus, a coating of the oxide of the element is deposited on the surface while the "Freon" and the alcohol when volatile in the vapor of the propellant flash into the atmosphere. Since the solid particles do not exist until after the spray passes the valve it is manifest that these sprays will not obstruct the valves of the aerosol cans. In other words, a solution of the ester in the propellant is sprayed from the can. The ester on contact with small amounts of water hydrolyzes to yield the oxide of the element of the ester and the alcohol. Since the composition in the can is a true solution not a suspension, there is no stratification in the can.

Various emollients soluble in the propellant, such as propylene glycol, polypropylene glycol, and polyethylene glycol can be incorporated in the formulation. Other useful materials soluble in the propellant and not volatile at ambient temperatures can be admixed with the ester and propellant.

Illustrative of the partially fluorinated, or wholly fluorinated, or partially fluorinated-partially chlorinated, or partially fluorinated-partially brominated aliphatic hydrocarbons having not more than two carbon atoms are the following propellants available under the trademark "Freon":

"Freon-112," difluorotetrachloroethane,
"Freon-113," trifluorotrichloroethane,
"Freon-114B2," tetrafluorodibromoethane,
"Freon-11," trichloromonofluoromethane,
"Freon-21," dichloromonofluoromethane,
"Freon-114," dichlorotetrafluoroethane,
"Freon-12," difluorodichloromethane,
"Freon-115," pentafluoromonochloroethane,
"Freon-22," difluoromonochloromethane,
"Freon-13B1," trifluoromonobromomethane,
"Freon-116," hexafluoroethane,
"Freon-13," trifluoromonochloromethane,
"Freon-23," trifluoromethane,
"Freon-14," tetrafluoromethane.

Esters of titanium are available under the trade name "Tyzor" from Du Pont. Esters of the other Group IV elements such as the esters of silicon can be made in the usual or other suitable manner. At present the titanium esters are preferred.

Illustrative of the self-propelling powder-dispensing compositions of the present invention are the following examples. A powder or a powder carrying a useful material, such as an emollient, can be prepared by preparing a concentrate comprising by weight ten percent of tetraisopropyl titanate and ninety percent of a mixture of "Freon-12" and "Freon-114" in the proportion of about 1 to about 100 of Freon 12 to one part of Freon 114. The powder-dispensing solution is prepared by mixing about eighty percent of the aforesaid concentrate with about twenty percent of a mixture of the same "Freons." (That is to say the propellant-solvent is one which has a vapor pressure at ambient temperature of about 5 to about 150 pounds per square inch gauge and in which the ester is soluble up to at least twenty percent by weight.) Alternatively, the titanate may be added directly to the container and the propellant may be added thereto in the usual manner.

A useful powder-dispensing solution for the deposition "snow" for decorative purposes comprises about 5 percent by weight of tetrastearyl titanate and about 95 percent of halogenated aliphatic hydrocarbons or polyhalogenated lower alkane refrigerant-propellant, such as an 80:20 weight fraction mixture of "Freon 12" and "Freon 114."

What is claimed is:
1. A nonaqueous pressurized solution of about 5% to 20% by weight of a hydrolyzable ester dissolved in a refrigerant-propellant, said solution being held under pressure in a valved container whereby said solution is maintained in the liquid state as a self-propelling composition, wherein said hydrolyzable ester is an alkyl ester of an acid corresponding to the formula $H_4MO_4$ in which M is an element selected from the group consisting of silicon, titanium, germanium, zirconium, tin, and hafnium and said alkyl group contains one of twenty-two carbon atoms, and said refrigerant-propellant is a polyhalogenated lower alkane containing from one to two carbon atoms, the ester in said solution being adapted to react with ambient water vapor in the atmosphere to form the oxide of the element in powder form after leaving the container through the valve.

2. A nonaqueous pressurized solution as defined in claim 1 wherein said ester is tetrapropyl titanate.

3. A nonaqueous pressurized solution as defined in claim 1 wherein said ester is tetrastearyl titanate.

4. A nonaqueous pressurized solution as defined in claim 1 wherein said refrigerant-propellant is a mixture of dichlorodifluoromethane and dichlorotetrafluoroethane.

References Cited

UNITED STATES PATENTS

| | | | |
|---|---|---|---|
| 2,803,906 | 8/1957 | Steinhilber | 252—305 |
| 2,835,997 | 5/1958 | Steinhilber | 252—305 |
| 2,941,895 | 6/1960 | Haslam | 106—193 |
| 2,968,628 | 1/1961 | Reed | 252—305 |
| 2,993,866 | 7/1961 | Vaughn et al. | 252—305 |
| 3,119,852 | 1/1964 | Gilsdorf | 260—429.5 |
| 3,306,918 | 2/1967 | Schenk et al. | 260—429.5 |

LEON D. ROSDOL, Primary Examiner

W. E. SCHULZ, Assistant Examiner

U.S. Cl. X.R.

106—290